United States Patent [19]

Gerhardt

[11] 3,937,316

[45] Feb. 10, 1976

[54] METHOD OF AND MEANS FOR COOLING SUPPORT TRAYS FOR HOT-PRESSED BOARDS

[75] Inventor: Klaus Gerhardt, Rheurdt, Germany

[73] Assignee: G. Siempelkamp & Co., Krefeld, Germany

[22] Filed: Mar. 10, 1975

[21] Appl. No.: 556,965

[30] Foreign Application Priority Data

Mar. 12, 1974 Germany............................ 2411660

[52] U.S. Cl..................... 198/156; 198/85; 214/310

[51] Int. Cl.$^2$........................................... B65G 17/12

[58] Field of Search......... 198/24, 35, 85, 154, 156, 198/157; 214/6 TS, 310; 271/172, 173; 100/196

[56] References Cited

UNITED STATES PATENTS

| | | | |
|---|---|---|---|
| 1,736,866 | 11/1929 | Wagner et al. | 198/156 X |
| 2,274,842 | 3/1942 | McCann | 198/156 X |
| 3,068,987 | 12/1962 | Franklin | 198/85 X |
| 3,078,979 | 2/1963 | Block et al. | 198/85 X |
| 3,268,055 | 8/1966 | Stein et al. | 198/156 X |

*Primary Examiner*—Evon C. Blunk
*Assistant Examiner*—Richard K. Thomson
*Attorney, Agent, or Firm*—Karl F. Ross; Herbert Dubno

[57] ABSTRACT

Trays carrying hot-pressed boards, coming from a platen press, are delivered by an input conveyor to a cooling rack comprising an endless vertical transporter with chain-supported radial arms forming peripherally separated tray-receiving stages, the boards being stripped off the oncoming trays and being temporarily retained on the input conveyor as the trays advance into stages then aligned therewith. Upon the loading of each tray into a transporter stage, the board previously stripped therefrom is released and passed by the input conveyor on through a clearance between successive stages on the ascending side of the slowly moving transporter into the nip of a set of feed rollers which drive that board through a similar clearance on the descending side onto an output conveyor. The empty trays, after passing around the upper vertex of the transporter to the descending side, are intercepted either by the output conveyor receiving the boards or by another outgoing conveyor overlying the latter for removal from the cooling rack and recirculation to the press via a loading station. Each conveyor is divided into several endless bands offset from the orbits of the radial transporter arms, the bands being located on a level near the lower vertex.

10 Claims, 5 Drawing Figures

METHOD OF AND MEANS FOR COOLING SUPPORT TRAYS FOR HOT-PRESSED BOARDS

FIELD OF THE INVENTION

My present invention relates to a method of and means for unloading and cooling a series of trays carrying flat, hot workpieces, such as hot-pressed boards coming from a platen press.

BACKGROUND OF THE INVENTION

Trays delivering loosely coherent boards of cellulosic and thermosetting material, to be cured under heat and pressure to form so-called fiberboard or chipboard plates, remain with their load in a platen press during the curing operation and are correspondingly heated on leaving the press. In order to enable such trays to be quickly ready for re-use, they must be suitably cooled before passing again through a loading station on their way to the press. Such cooling can be done in air with the aid of a slow-moving rack receiving the empty trays and carrying them over a predetermined path to a point of discharge. With proper synchronization between the movement of the rack and the operation of the platen press, as well as the various conveyors carrying the trays in a closed circuit through the press and the rack, no manual intervention of an operator is necessary anywhere in the cycle.

In such systems, however, the required unloading of each tray on its approach to the rack introduces the complication since additional structure is needed for gripping the hot boards, generally with the aid of suction cups, and depositing them on an ancillary conveyor as the trays move toward the cooling rack.

OBJECTS OF THE INVENTION

An important object of my present invention, therefore, is to provide an expeditious and economical method of separating a hot tray from its load on the approach of a cooling rack and guiding both the tray and the rack to their respective destinations with a minimum of additional structure.

A related object is to provide an apparatus of compact construction for unloading a series of hot trays and cooling the latter in an efficient manner.

SUMMARY OF THE INVENTION

In accordance with my present invention, a movable cooling rack is designed as a vertical transporter forming a multiplicity of peripherally separated tray-receiving stages which move in an endless path around an upper and a lower vertex, the oncoming hot trays being serially fed on an input conveyor to the ascending side of this transporter. Upon the approach of a tray to the transporter, the workpiece carried thereby is stripped from the tray and is temporarily retained on the input conveyor while the tray is advanced by the conveyor into the confronting transporter stage. After a movement of the transporter sufficient to align the input conveyor with a clearance between stages on the ascending side and a similar clearance on the descending side of the transporter, the retained workpiece is released and passed from the input conveyor through the aligned clearances onto an output conveyor on the descending side. The tray, after traveling around the upper vertex of the transporter at a rate slow enough to cool it, is discharged from its stage on the descending side, either by the aforementioned output conveyor or by an intercepting conveyor overlying the output conveyor. If the same output conveyor is used for alternately discharging workpieces and trays, a switch at the end of that output conveyor may be periodically reversed to direct the workpieces to one destination and the trays to another, specifically back to the platen press in the system here particularly envisaged.

Pursuant to a more particular feature of my invention, the transporter comprises upper and lower sprocket pairs which are axially spaced apart and engaged by a pair of endless chains that are interlinked by cross-bars at peripherally spaced locations, each cross-bar supporting a plurality of axially spaced tray holders defining one of the transporter stages. Each conveyor advantageously comprises one or more endless bands which are offset from the orbits of the tray holders and terminate close to the path of the cross-bars so as to be able to feed each workpiece directly into an inter-stage clearance in the case of the input conveyor and to receive the workpiece with little spacing through such a clearance in the case of the output conveyor. If, however, the ascending and descending branches of the transporter chains are widely separated, ancillary feed means such as roller pairs should be provided within the transporter in line with the conveyor bands for transferring an oncoming workpiece from the input conveyor to the output conveyor. If the operating speed of the conveyors and the ancillary feed means, if any, is high enough with reference to the peripheral speed of the transporter, and if the interstage clearances are sufficiently wide, the feed-through of the workpieces will not require any stopping of the transporter chains so that the same can be driven continuously.

In order to maximize the cooling path for the trays, the input and output conveyors are preferably disposed substantially at the level of the axis of the lower sprocket pair.

BRIEF DESCRIPTION OF THE DRAWING

The above and other features of my invention will now be described in detail with reference to the accompanying drawing in which.

SPECIFIC DESCRIPTION

Figure 2:
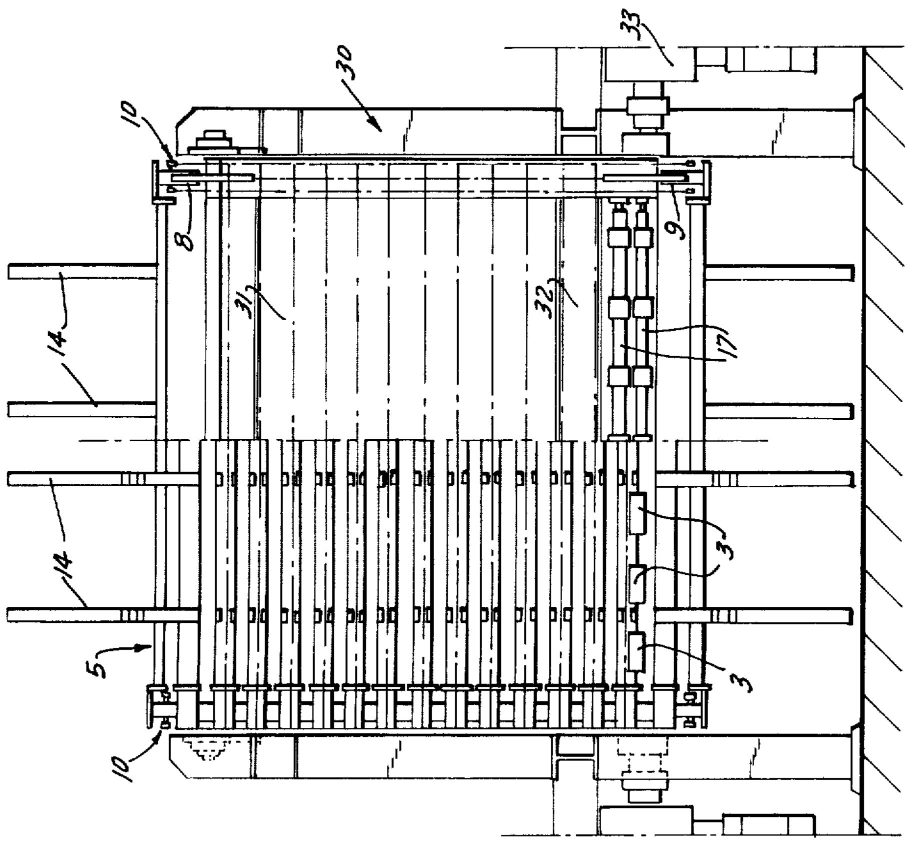
FIG. 2 is partly an end view of the rack and partly a sectional view taken on the line II — II of FIG. 1.

In the drawing I have shown a rack 5 for the cooling of a series of hot trays 1 sequentially delivered by an input conveyor 18, each oncoming tray being loaded with a workpiece 2 in the shape of a flat pressed board coming from a nonillustrated platen press. The rack 5 comprises a vertical transporter on a stationary machine frame 30, the transporter including two pairs of corotating sprockets 8 and 9 engaged by endless chains 10. The sprockets are axially spaced apart, by substantially the full width of frame 30, on an upper shaft 38 and a lower shaft 39; the latter shaft is driven by a nonillustrated motor in a transmission housing 33.

The chains 10 are spanned by cross-bars 36 which are separated by clearances 37 whose width, along the ascending run 11 and the descending run 12 of the transporter, is about equal to that of the bars 36. Each bar carries four axially spaced tray holders in the form of pairs of peripherally separated, parallel radial arms 14 defining tray-receiving stages 13 which are separated by the clearances 37. Input conveyor 18 and an output conveyor 19, both disposed substantially at the level of the lower sprocket shaft 39, include each a plurality of axially spaced endless bands 3, 6 which are offset from the orbits of the arms 14 as illustrated for the bands 3 on the left-hand side of FIG. 2. The bands terminate close to the path of the cross-bars 36 between the orbiting arms 14.

Figure 1:
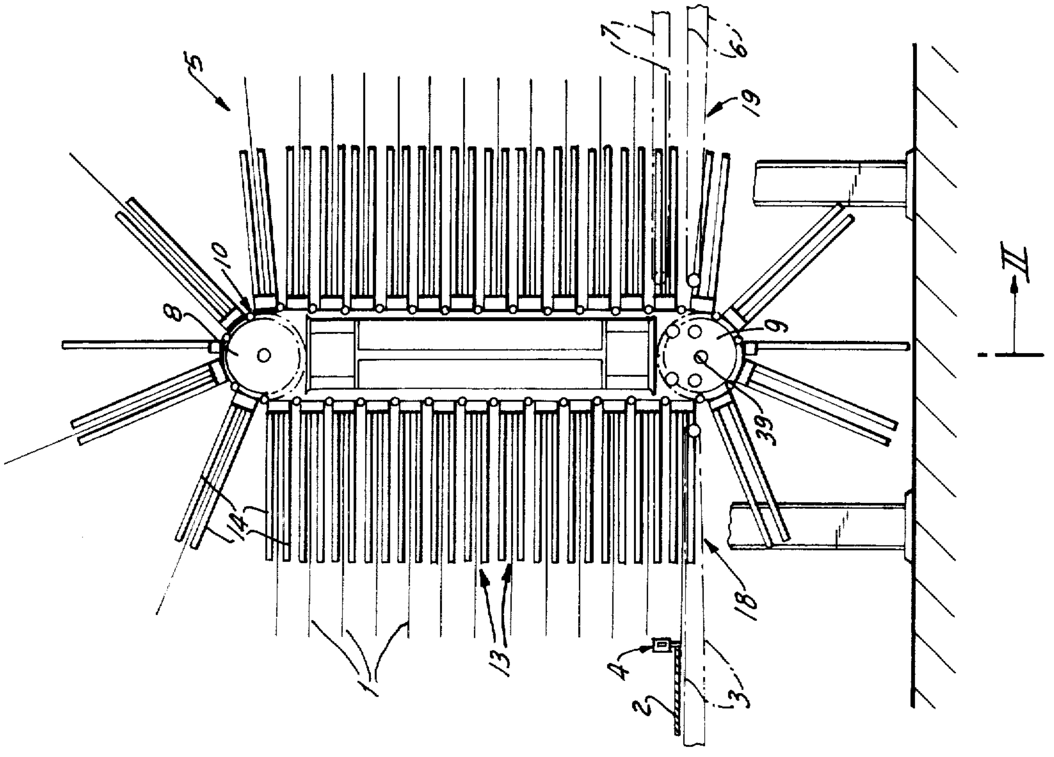
FIG. 1 is a somewhat diagrammatic side-elevational view of a cooling rack and associated conveyors in an apparatus embodying my invention.
Figure 3:
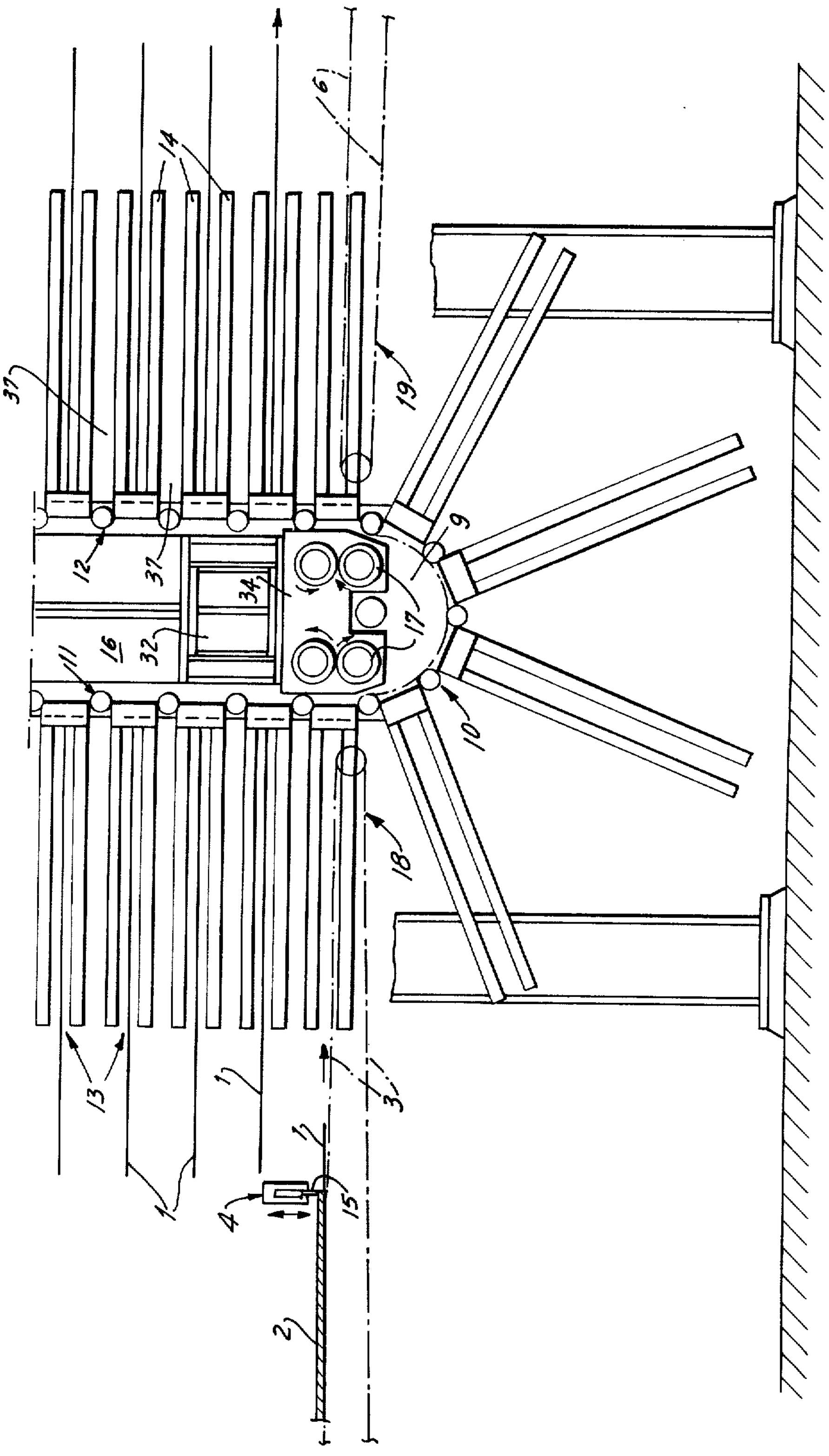
FIGS. 3, 4 and 5 are side views of the lower part of the rack and associated conveyors, drawn to a larger scale than in FIGS. 1 and 2, in different operating positions.
Figure 4:
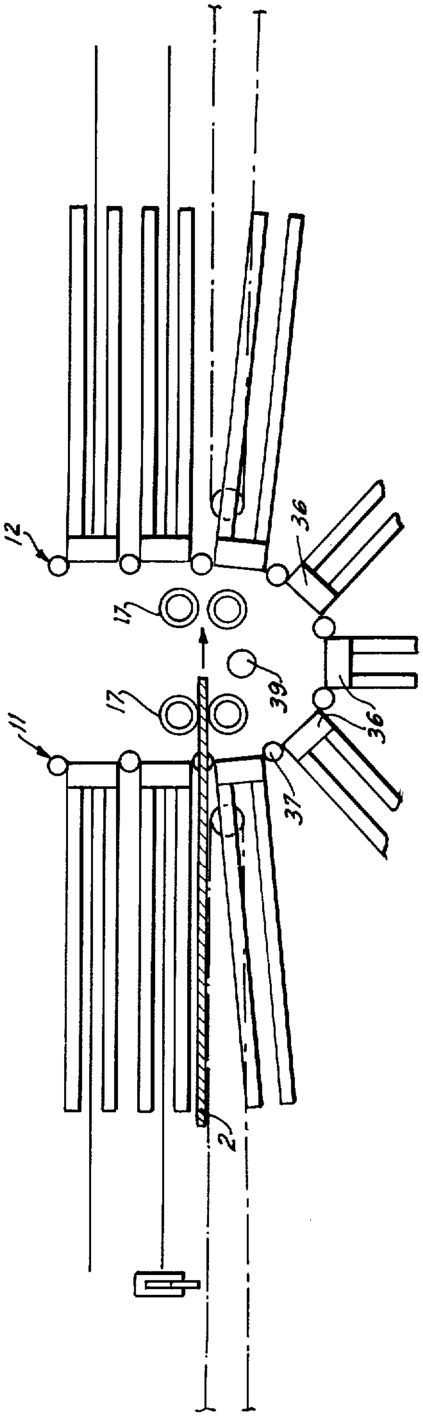
Figure 5:
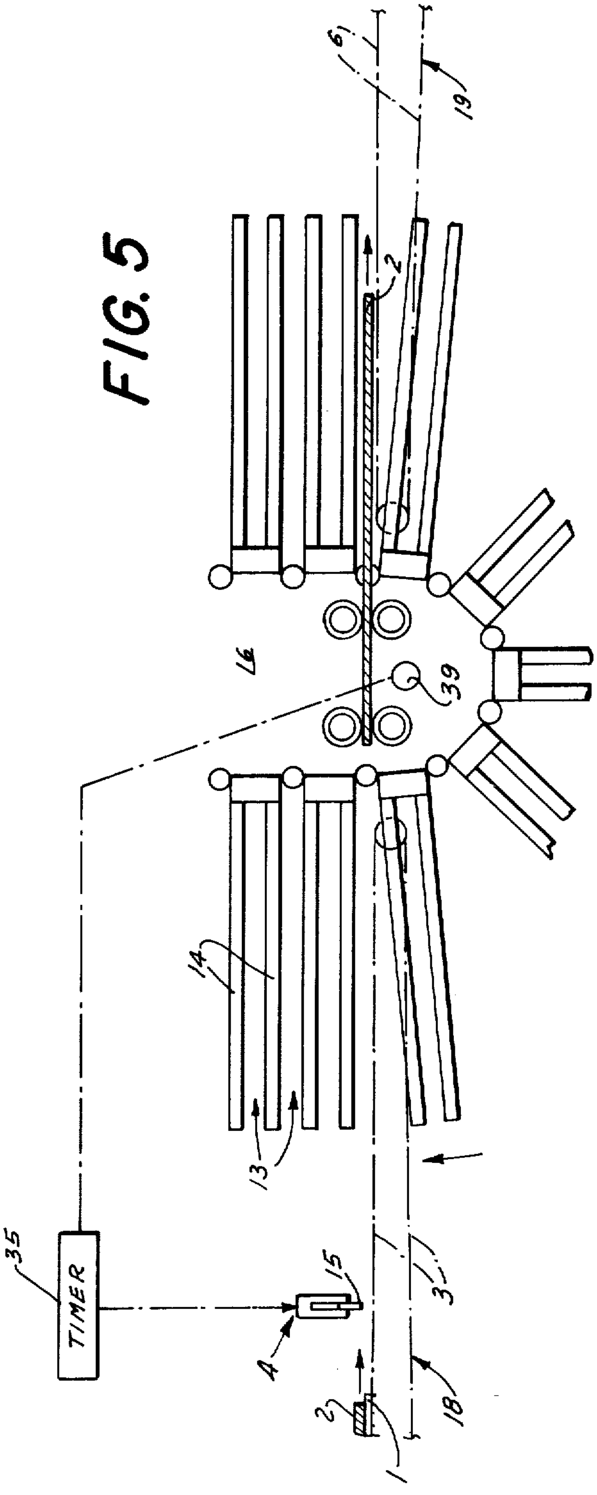

The spacing of the bars 36 is so chosen that two clearances 37 will simultaneously confront the upper runs of conveyors 18 and 19 at periodic intervals, as seen in FIGS. 4 and 5. Between these intervals, as illustrated in FIGS. 1 and 3, input conveyor 18 faces a stage 13 slowly rising past. Another outgoing conveyor 7 has been illustrated in FIG. 1 above the conveyor 6 to intercept cooled trays which have passed around the upper vertex of the clockwise-rotating transporter. As explained above, however, the provision of such an intercepting conveyor is not essential since the output conveyor 6 could be used for alternately directing trays 1 and workpieces 2 to different destinations.

Disposed in the space 16 between the ascending and descending runs 11 and 12 are two pairs of feed rollers 17 in line with conveyors 18 and 19. The conveyors and the feed rollers are driven by nonillustrated motors at a speed which is high compared with that of shafts 38 and 39.

A detent 4 overlies the input conveyor 18 on the approach of rack 5 for the purpose of separating an oncoming tray 1 from its load 2, this detent comprising a stripper blade 15 which can be raised and lowered, e.g. electromagnetically, under the control of a timer 35 responding to the positions of drive shaft 39 as diagrammatically illustrated in FIG. 5. The drive shaft may be provided, for example, with a conventional magnetic position sensor emitting a pulse whenever a transporter stage 13 moves out of alignment with input conveyor 18. The timer, in response to that pulse, actuates the detent 4 to retract the blade 15 momentarily so as to give passage to a previously retained board 2 which can thus continue on conveyor 18 into a confronting clearance 37 beyond which it is engaged by the feed rollers 17 and transferred to another such clearance on the descending side to the output conveyor 6. This sequence of steps is illustrated in FIGS. 3 - 5, FIG. 3 showing the detention of a board 2 by the stripper blade 15 as the associated tray 1 advances into a transporter stage 13; in FIG. 4 the board 2 has been released and has entered into the nip of the first roller pair 17, while in FIG. 5 the board has already reached the output conveyor 19 for removal from the transporter and return to the platen press by way of a loading station where it picks up another board to be cured. The tray 1, held between the arms 14 of its transporter stage, moves around the upper vertex of the transporter and eventually is discharged by conveyor 7 as discussed above.

Frame 30 includes upper and lower cross-beams 31, 32, the latter beam supporting a gear box 34 forming part of the drive for the feed rollers 17.

I claim:

1. A method of unloading and cooling a series of trays carrying flat, hot workpieces, comprising the steps of:

serially feeding hot trays loaded with workpieces on an input conveyor to the ascending side of a vertical transporter forming a multiplicity of peripherally separated tray-receiving stages moving in an endless path around an upper and a lower vertex;

upon the approach of a tray to said transporter, stripping the workpiece therefrom and temporarily retaining same on the input conveyor while advancing the tray into a confronting stage of the transporter;

after a movement of the transporter sufficient to align the input conveyor with a clearance between stages on the ascending side and a similar clearance on the descending side of the transporter, releasing the retained workpiece and passing same from the input conveyor through the aligned clearances onto an output conveyor on the descending side of the transporter; and discharging the tray from its stage on the descending side after a travel around the upper vertex of the transporter.

2. A method as defined in claim 1 wherein the trays are fed to and removed from the transporter at a level near the lower vertex thereof.

3. A method as defined in claim 1 wherein the trays are intercepted and discharged from the transporter above the level of the output conveyor.

4. An apparatus for unloading and cooling a series of trays carrying flat, hot workpieces, comprising:

a cooling rack including a vertical transporter forming a multiplicity of peripherally spaced tray-receiving stages movable in an endless path around an upper and a lower vertex;

an input conveyor approaching an ascending side of said transporter for serially feeding trays loaded with workpieces thereto;

detent means above said input conveyor operable to strip a workpiece from an oncoming tray and to retain the workpiece on said input conveyor during the advance of the tray into a stage aligned therewith;

an output conveyor in line with said input conveyor at a descending side of said transporter, said input and output conveyors being disposed at a level at which they are simultaneously aligned with inter-stage clearances on both the ascending and the descending side at periodically recurrent intervals;

control means for deactivating said detent means in correlation with the movement of said transporter at a time of alignment of said conveyors with inter-stage clearances for passing a retained workpiece from said input conveyor through the aligned clearances onto said output conveyor; and discharge means for removing each tray from said transporter on the descending side thereof.

5. An apparatus as defined in claim 4 wherein said discharge means comprises an intercepting conveyor above the level of said output conveyor.

6. An apparatus as defined in claim 4 wherein said transporter comprises upper and lower axially spaced sprocket pairs, a pair of endless chains passing around said sprocket pairs, cross-bars interlinking said chains at peripherally spaced locations, and a plurality of axially spaced tray holders on each cross-bar defining one of said stages, said conveyors comprising endless bands offset from the orbits of said tray holders, said bands terminating close to the path of said crossbars.

7. An apparatus as defined in claim 6 wherein each of said tray holders comprises a pair of peripherally separated radial arms.

8. An apparatus as defined in claim 6, further comprising ancillary feed means disposed between said ascending and descending sides in line with said bands for transferring an oncoming workpiece from said input conveyor to said output conveyor.

9. An apparatus as defined in claim 8 wherein said ancillary feed means comprises a plurality of roller pairs.

10. An apparatus as defined in claim 6 wherein said input and output conveyors are disposed substantially at the level of the axis of said lower sprocket pair.

* * * * *